(12) United States Patent
Liu et al.

(10) Patent No.: US 12,167,391 B2
(45) Date of Patent: Dec. 10, 2024

(54) METHOD AND APPARATUS FOR SLOT FORMAT INDICATION

(71) Applicant: LENOVO (BEIJING) LIMITED, Beijing (CN)

(72) Inventors: Hongmei Liu, Beijing (CN); Lianhai Wu, Beijing (CN); Zhennian Sun, Beijing (CN); Haipeng Lei, Beijing (CN); Zhi Yan, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 396 days.

(21) Appl. No.: 17/418,213

(22) PCT Filed: Jan. 9, 2019

(86) PCT No.: PCT/CN2019/070949
§ 371 (c)(1),
(2) Date: Jun. 24, 2021

(87) PCT Pub. No.: WO2020/142917
PCT Pub. Date: Jul. 16, 2020

(65) Prior Publication Data
US 2022/0086881 A1  Mar. 17, 2022

(51) Int. Cl.
*H04W 72/0446*  (2023.01)
*H04W 56/00*  (2009.01)
(Continued)

(52) U.S. Cl.
CPC ... *H04W 72/1273* (2013.01); *H04W 56/0045* (2013.01); *H04W 72/0446* (2013.01); *H04W 72/23* (2023.01)

(58) Field of Classification Search
CPC ........... H04W 56/004; H04W 56/0045; H04W 56/005; H04W 72/0446; H04W 72/1263;
(Continued)

(56) References Cited

U.S. PATENT DOCUMENTS 9,106,356 B2  8/2015  Hoshino et al.
2006/0209970 A1*  9/2006  Kanterakis ............ H04L 1/0009
714/790

(Continued)

FOREIGN PATENT DOCUMENTS

WO  2017171390 A1  10/2017

OTHER PUBLICATIONS

Nokia, Nokia Shanghai Bell, Resource allocation/coordination between Parent BH and Child links, 3GPP TSG RAN WG1 Meeting #94bis, R1-1810675, Oct. 8-12, 2018, pp. 1-10, Chengdu, China.
(Continued)

*Primary Examiner* — Matthew W Genack
(74) *Attorney, Agent, or Firm* — Kunzler Bean & Adamson

(57) ABSTRACT

Embodiment of the present application is directed to a method and apparatus for slot format indication. According to an embodiment of the present application, the method includes receiving at least one signal indicating one of: whether at least one symbol at a beginning of a sequence of consecutive symbols transmitted or received over a communication link is reserved or is to be reserved, and whether at least one symbol at an end of the sequence of consecutive symbols transmitted or received over the communication link is reserved or is to be reserved. The at least one uplink transmission is performed based on the received signal in response to the communication link being associated with an uplink transmission. The at least one downlink reception is performed based on the received signal in response to the communication link being associated with downlink reception.

18 Claims, 8 Drawing Sheets

(51) Int. Cl.
*H04W 72/1273* (2023.01)
*H04W 72/23* (2023.01)

(58) Field of Classification Search
CPC ......... H04W 72/1268; H04W 72/1273; H04W 72/20; H04W 72/23; H04W 72/231; H04W 72/232
See application file for complete search history.

(56) References Cited

U.S. PATENT DOCUMENTS

| | | | |
|---|---|---|---|
| 2014/0086161 A1* | 3/2014 | Cai | H04W 56/0045 370/329 |
| 2014/0334390 A1* | 11/2014 | Lindholm | H04L 5/0053 370/329 |
| 2015/0180629 A1 | 6/2015 | Lorca Hernando | |
| 2019/0349079 A1* | 11/2019 | Novlan | H04B 7/15542 |
| 2021/0288842 A1* | 9/2021 | Chatterjee | H04L 5/0092 |

OTHER PUBLICATIONS

Qualcomm Incorporated, Resource Management in IAB Network, 3GPP TSG RAN WG1 Meeting #94bis, R1-1811258, Oct. 8-Oct. 12, 2018, pp. 1-8, Chengdu, China.

Huawei, Hisilicon, Physical layer design for NR IAB, 3GPP TSG RAN WG1 Meeting #95, R1-1812198, Nov. 12-16, 2018, pp. 1-15, Spokane, USA.

Lenovo, Motorola Mobility, Discussion on resource partitioning for IAB network, 3GPP TSG RAN WG1 Meeting #95, R1-1812786, Nov. 12-16, 2018, pp. 1-4, Spokane, USA.

Internation Searching Authority, "Written Opinion of the International Searching Authority," PCT/CN2019/070949, Sep. 24, 2019, pp. 1-4.

* cited by examiner

METHOD AND APPARATUS FOR SLOT FORMAT INDICATION

TECHNICAL FIELD

Embodiments of the present application generally relate to wireless communication technology, especially to timing technology in a wireless communication system.

BACKGROUND

In the 3rd Generation Partnership Project (3GPP), deployment of relay nodes (hereinafter referred to as "RNs") in a wireless communication system is promoted. One objective for deploying RNs is to enhance coverage area of a base station (hereinafter referred to as "BS") by improving the throughput of a mobile device (also known as a user equipment (UE)) located in a coverage hole or far from the BS resulting in low signal quality.

In a wireless communication system employing RNs, a BS that can provide connection to at least one RN is called a donor BS with the RN being connected to a donor BS by a backhaul link. A Relay Node may hop through one or more RNs before reaching a donor BS or may be directly connected to the donor BS. Similar to RN technology, for a new radio (NR) communication networks, 3GPP is envisioning an integrated access and backhaul (IAB) architecture to support multi-hop relays, wherein a single IAB node may act as a parent IAB node and as a child IAB node, simultaneously, within the IAB architecture. This means that the IAB mode may simultaneously receive data, including signalling etc., from a parent node on a backhaul downlink and from a child node on a backhaul uplink.

Accordingly, to enable simultaneous reception at an IAB node from a parent node on a backhaul downlink and a child node on a backhaul uplink, RANP RP182329 provides a new timing scheme, which is also called Case 7 timing. However, this timing scheme introduces a plurality of new timing scenarios different from the legacy RANI release, that require new solutions to be supported so that the new timing scheme can be deployed in NR.

SUMMARY OF THE APPLICATION

An embodiment of the present application provides a method, including receiving at least one signal indicating one of: whether at least one symbol at the beginning of a sequence of consecutive symbols transmitted or received over a communication link is reserved or is to be reserved, and whether at least one symbol at the ending of a sequence of consecutive symbols transmitted or received over the communication link is reserved or is to be reserved. At least one uplink transmission is performed based on the received signal in response to the communication link being associated with uplink transmission. At least one downlink reception is performed based on the received signal in response to the communication link being associated with downlink reception.

Another embodiment of the present application provides an apparatus, including at least one receiver and at least one transmitter. The at least one receiver may receive at least one signal indicating one of: whether at least one symbol at the beginning of a sequence of consecutive symbols transmitted or received over a communication link is reserved or is to be reserved, and whether at least one symbol at the ending of a sequence of consecutive symbols transmitted or received over communication link is reserved or is to be reserved. The at least one receiver may furthermore perform downlink reception based on the received signal in response to the communication link being associated with downlink reception. The at least one transmitter may perform an uplink transmission based on determination of the received signal in response to the communication link being associated with uplink transmission.

Yet another embodiment of the present application provides an apparatus, including: at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement a method according to an embodiment of the present application with the at least one receiver, the at least one transmitter and the at least one processor.

Embodiments of the present application provide a novel method and apparatus for slot format indication in a wireless communication system, especially for timing scenarios under Case 7 timing, which will further facilitate the deployment of the NR.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Relaying function enables an operator to improve and extend the coverage of a base station (BS) by having a relay node (RN) wirelessly connected to a BS. Integrated access and backhaul (IAB) architecture evolved from an earlier relay technology. Moreover, an IAB architecture supporting multi-hop relays and multi-connectivity has been envisioned for NR, for example 5G communication networks, wherein single-hop should be considered as a special case of multi-hop, and single-connectivity should be considered as a special case of multi-connectivity.

Figure 1:
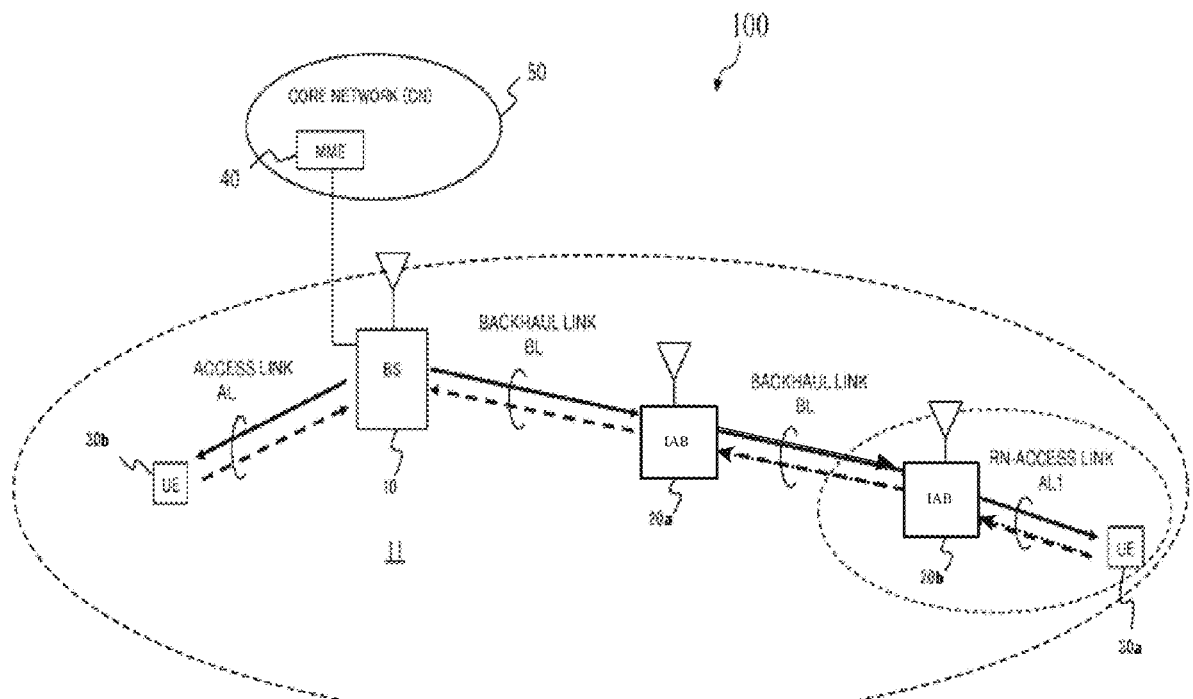
FIG. 1 illustrates a schematic view of a wireless communication system employing IAB architecture according to an embodiment of the present application.

FIG. 1 illustrates a schematic view of a wireless communication system 100 employing IAB architecture according to an embodiment of the present application.

Referring to FIG. 1, the wireless communication system 100 employing IAB architecture is comprised of a plurality of nodes, including at least one BS 10, two IAB nodes 20, including a first IAB node 20a and a second IAB node 20b, and a plurality of UEs 30, including a first UE 30a and a second UE 30b. It should be noted that the wireless communication system 100 is shown for illustrating the principle of the present application in a clear and concise manner. Although only one BS 10, two IAB nodes 20 and two UEs 30 are shown for simplicity, the wireless communication system 100 may further include more BSs 10, IAB nodes 20, and UEs 30. Persons skilled in the art is aware that in a real communication system there can be more nodes and corresponding routes among them and can clearly determine their relationship and how they operate based on the disclosure and teaching of the embodiments of the present application.

The BS 10 operates under the control of a mobility management entity (MME) 40 in a core network (CN) 50. The BS 10 may be based on and support, for example, a long-term evolution (LTE), LTE-Advanced (LTE-A), new radio (NR), or other suitable standards. For example, the BS 10 may be an eNB (evolved Node Base) or a gNB and may define one or more cells 11. The BS 10 is the donor BS for the IAB nodes 20, and can be also refer to as a "donor," "IAB donor" or "donor node."

Each IAB node 20 may include a distribution unit (DU) (not shown) and a mobile termination (MT) unit (not shown). Accordingly, each IAB nodes 20 may be connected to a parent IAB node or a BS 10 via the MT unit and may be connected to UEs 30 or a child IAB node(s) via the DU. The UEs 30 may represent a computing device, a wearable device, or a mobile device, etc. The donor node 10 may act as a serving IAB node, i.e. a parent IAB node, and include a DU (not shown) to support UEs 30 and MT units of the IAB nodes 20. The donor node 10 may further include a centralized unit (CU) (not shown) for the DUs of all IAB nodes 20 and for its own DU. The CU may support at least RLC layer, and the DU may support at least medium access control (MAC) layer and physical layer for all the IAB nodes 20, e.g. those defined in TS 38.300 and TS 38.331, etc.

The second UE 30b and the first IAB 20a may communicate with the donor node 10 through an access link (AL) and a backhaul link (BL), respectively. The second IAB node 20b may communicated with the donor node 10 via a parent node (also called "a serving node"), i.e., the first IAB node 20a. The first UE 30a may communicate with the second IAB node 20b through an RN-ACCESS LINK (AL1) and then reach the donor node 10 via the first IAB node 20a. That is, the first UE 30a communicates with the donor node 10 via a multi-hop route. Specifically, in the multi-hop route, the first IAB node 20a is a parent node of the second IAB node 20b, and the second IAB node 20b is a parent node of the first UE 30a. In other words, the second IAB node 20b is a child node of the first IAB node 20a, and the first UE 30a is a child node of the second IAB node 20b.

Although FIG. 1 shows that the donor node 10 and the IAB nodes 20 are respectively connected to a single UE 30, both the donor node 10 and IABs 20 are capable of providing connections to multiple UEs 30. Moreover, in an embodiment of the present disclosure, at least one of the IAB nodes 20 and UEs 30 may have multiple active routes to the BS 10, i.e., multi-connectivity rather than single-connectivity. An "active route" of a node means this node is allowed to transmit or receive data in this route, and contains multiple links in a multi-hop IAB system.

As shown in FIG. 1, a link within a multi-hop route may be an access link (AL) or backhaul link. A link between a node and its parent node, can be called "a parent link," while a link between a node and its child node can be called "a child link." The parent link is a parent backhaul link, while the child link is a child backhaul link or an access link. Bi-directional transmission or reception can be performed in each link, for example, an uplink transmission with respect to a parent node, an uplink reception with respect to a child node, a downlink transmission with respect to a child node, and a downlink reception with respect to a parent node. Accordingly, the first IAB node 20a may need to simultaneously receive date from the donor node 10 on a parent backhaul downlink and receive data from the second IAB node 20b on a child backhaul uplink. Similarly, the second IAB node 20b may need to simultaneously receive date from the first IAB node 20a on a parent backhaul downlink and receive data from the first UE 30a on a child uplink.

According to the Case 7 timing scheme, the downlink transmission timing for all IAB nodes 20 is aligned with the downlink transmission timing of a parent node, i.e., a parent IAB node or a donor node 10; and the uplink reception timing of an IAB node 20 is aligned with this IAB node's downlink reception timing. However, in a legacy timing scheme, the uplink reception timing of each node, for example an IAB node 20 or its child IAB node is aligned with the downlink transmission timing. Thus, the Case 7 timing scheme will introduce timing scenarios different from the legacy timing scheme. Communication according to these new timing scenarios can be supported by embodiments of the present application.

Figure 2:
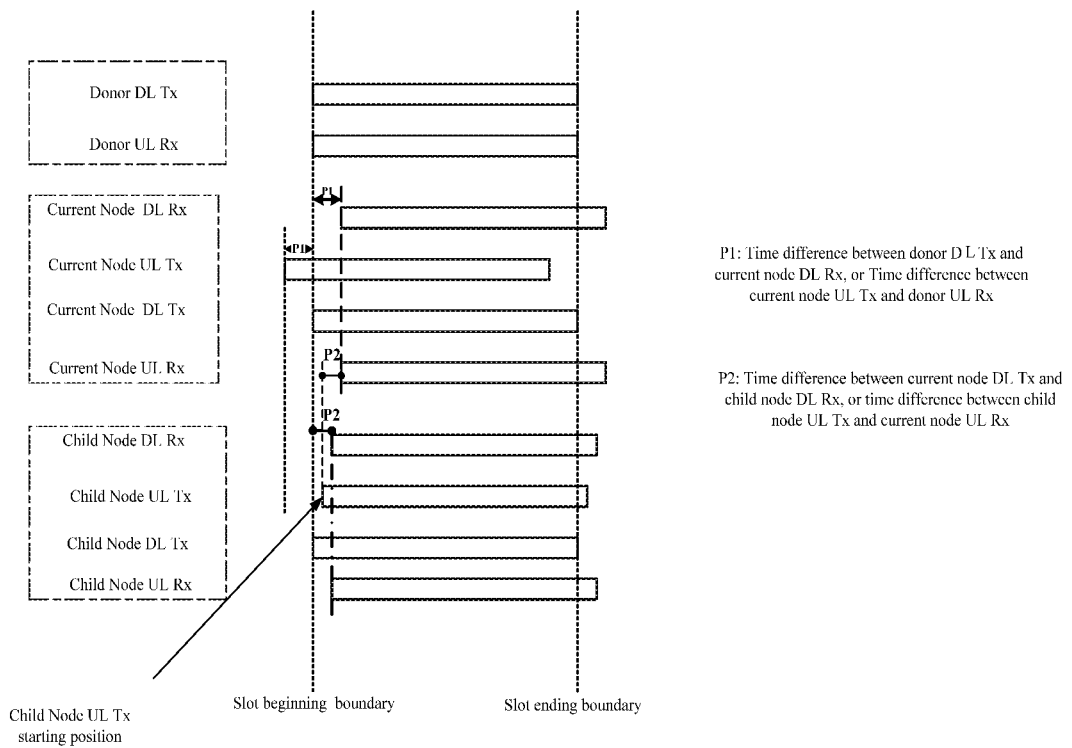
FIG. 2 illustrates a schematic view of an example of Case 7 timing according to an embodiment of the present application.

FIG. 2 illustrates a schematic view of an example of Case 7 timing according to an embodiment of the present application, which concerns the communication of an IAB node 20 (hereafter "current node") with its parent node and its child node, wherein a donor node 10 is specially used as the parent node. Communication of the first IAB node 20a with the donor node 10 and the second IAB node 20b can represent an exemplary scenario illustrated under the timing example of Case 7 timing shown in FIG. 2, wherein the first IAB node 20a can be a current node, the donor node 10 can be a parent node, and the second IAB node 20b can be a child node. In other embodiment of the present application, the timing example of Case 7 timing shown in FIG. 2 can also be applied to a communication among an IAB node 20 and a donor 10 and a UE 30 rather than an IAB node 20.

As shown in FIG. 2, the starting position of a downlink transmission in the donor node 10 ("Donor DL TX"), the downlink transmission in a current node ("Current Node DL TX"), for example the first IAB node 20a, and the downlink transmission in the child node ("Child Node DL TX"), for example, the second IAB 20b, are aligned to the slot beginning boundary. The starting position of downlink transmission in the donor node 10 ("Donor DL TX") is aligned with that of the uplink reception in the donor node 10 ("Donor UL RX"). The starting position of downlink reception in a current node ("Current Node DL Rx") is aligned with that of the uplink reception in the current node ("Current Node UL RX"). The starting position of downlink reception in a child node ("Child Node DL Rx") is aligned with that of the uplink reception in the child node ("Child Node UL RX"). Since the starting position of the downlink transmission in all the nodes are aligned, the starting position of downlink reception in the current node ("Current Node DL Rx") is decided by the propagation delay P1 between a parent node (a donor node in this example) and the current node. The starting position of the uplink reception in the current node ("Current Node UL RX") is decided by both the propagation delay P2 between the child node and the current node and the starting position of the uplink transmission in the child node ("Child Node UL Tx"). Although the timing for all various communications are shown to be aligned within a single slot boundary, that does not mean all the communications are performed in the same slot. The timing, for example, the starting position for each communication, is shown for a slot wherein such communication is to be performed.

According to Case 7 timing, as depicted in FIG. 2, the starting position of uplink reception by a current node is delayed at the receiver side thereof. According to some embodiments of the present application, in the case that there is transmission in the slot subsequent to the slot associated with the delayed uplink reception, a communication gap (e.g. a time delay or reserving at least one symbols) may be created to absorb the delay and allow switching between performing reception and transmission by the current node if necessary. Meanwhile, the starting position of the uplink transmission of a child node is also delayed at the transmitter side thereof. According to some embodiments of the present application, in the case that there is another downlink transmission or downlink reception in the slot subsequent to that for the delayed uplink transmission, a communication gap may be created to absorb the delay and allow switching between performing reception and transmission if necessary. In embodiments of the present application, the communication gap may be achieved by reserving at least one symbol between the delayed uplink communication and its subsequent communication.

According to an embodiment of the present application, the basic stages of a method for timing in a wireless communication system may be summarized as: receiving at least one signal indicating one of: whether at least one symbol at the beginning of a sequence of consecutive symbols transmitted or received over a communication link is reserved or is to be reserved, and whether at least one symbol at the ending of a sequence of consecutive symbols transmitted or received over the communication link is reserved or is to be reserved. At least one uplink transmission is performed based on the received signal in response to the communication link being associated with uplink transmission. At least one downlink reception is performed based on the received signal in response to the communication link being associated with downlink reception.

Dependent from different application scenarios, the sequence of consecutive symbols transmitted or received over a communication link can be a sequence of consecutive symbols for at least one uplink transmission, a sequence of consecutive symbols for at least one uplink reception, a sequence of consecutive symbols for at least one downlink transmission, or a sequence of consecutive symbols for at least one downlink reception.

In addition, embodiments of the present application also provide an apparatus for timing in a wireless communication system. According to an embodiment of the present application, the basic structure of the apparatus can be summarized as: at least one receiver and at least one transmitter. The at least one receiver may receive at least one signal indicating one of: whether at least one symbol at the beginning of a sequence of consecutive symbols transmitted or received over a communication link is reserved or is to be reserved, and whether at least one symbol at the ending of a sequence of consecutive symbols transmitted or received over the communication link is reserved or is to be reserved. The at least one receiver may also perform the downlink reception based on the received signal in response to the communication link being associated with downlink reception. The at least one transmitter may perform the uplink transmission based on the received signal in response to the communication link being associated with uplink transmission.

More details on the embodiments of the present application will be illustrated in the following text in combination with the appended drawings.

A first timing scenario under Case 7 timing is: performing a downlink transmission in a slot subsequent to that for an uplink reception in an IAB node, for example the first IAB node 20a or the second IAB node 20b as shown in FIG. 1. That is, for the IAB node, both the uplink reception and the subsequent downlink transmission are performed over a child link. The subsequent downlink transmission can be followed by another downlink transmission or another type of communication, and the uplink reception can be subsequent to another uplink reception or other type of communication. The child link can be a child backhaul link or an access link. Since the uplink reception is delayed, the end of the uplink reception will cross the slot ending boundary into the subsequent slot as demonstrated by the "Current Node UL Rx" shown in FIG. 2. In the case that there is a downlink transmission performed by the current node to take place in the subsequent slot, since the starting position of the downlink transmission is aligned with the slot beginning boundary as demonstrated by the "Current Node DL Tx" shown in FIG. 2, there may be an overlap between the data of an uplink reception and the data of a downlink transmission.

To avoid the overlapped data being lost, at least one symbol at the end of a sequence of consecutive symbols for the uplink reception or at the beginning of a sequence of consecutive symbols for the downlink transmission is reserved or punctured for a half-duplex node. When a symbol is "reserved or punctured," it means that such symbol may be set to be unavailable in a corresponding link communication, for example, an uplink reception, so that no valid data will be carried therein.

Since "transmission" and "reception" over a link is relative for two nodes defining such a link, the first timing scenario in an IAB node (e.g. current node, child node's parent node in FIG. 2) can also be illustrated as performing a downlink reception after an uplink transmission in a child node (e.g. child node, current node's child node in FIG. 2) of the IAB node (e.g. current node in FIG. 2). The first timing scenario is uplink reception followed by downlink transmission from the perspective of an IAB node (e.g. current node in FIG. 2), and what is described herein is uplink transmission followed by downlink reception, and it is from the perspective of the IAB node's child node (e.g. child node in FIG. 2). Accordingly, at least one symbol at the end of a sequence of consecutive symbols for the uplink transmission or at the beginning of a sequence of consecutive symbols for the downlink reception is reserved. For the child node, both the uplink transmission and the downlink reception are performed in the parent link.

In fact, according to an embodiment of the present application, another timing scenario similar to the first timing scenario only happens in a parent link of a child node, wherein a download reception is performed in a slot subsequent to that for an uplink transmission. Since the time difference between the uplink transmission and a subsequent downlink reception by a child node, e.g., a first UE30a is larger than time difference between the uplink reception and a subsequent downlink transmission by a parent node of the child node, e.g. the second IAB node 20b, this timing scenario can be totally supported by solutions for the first timing scenario.

Figure 3:
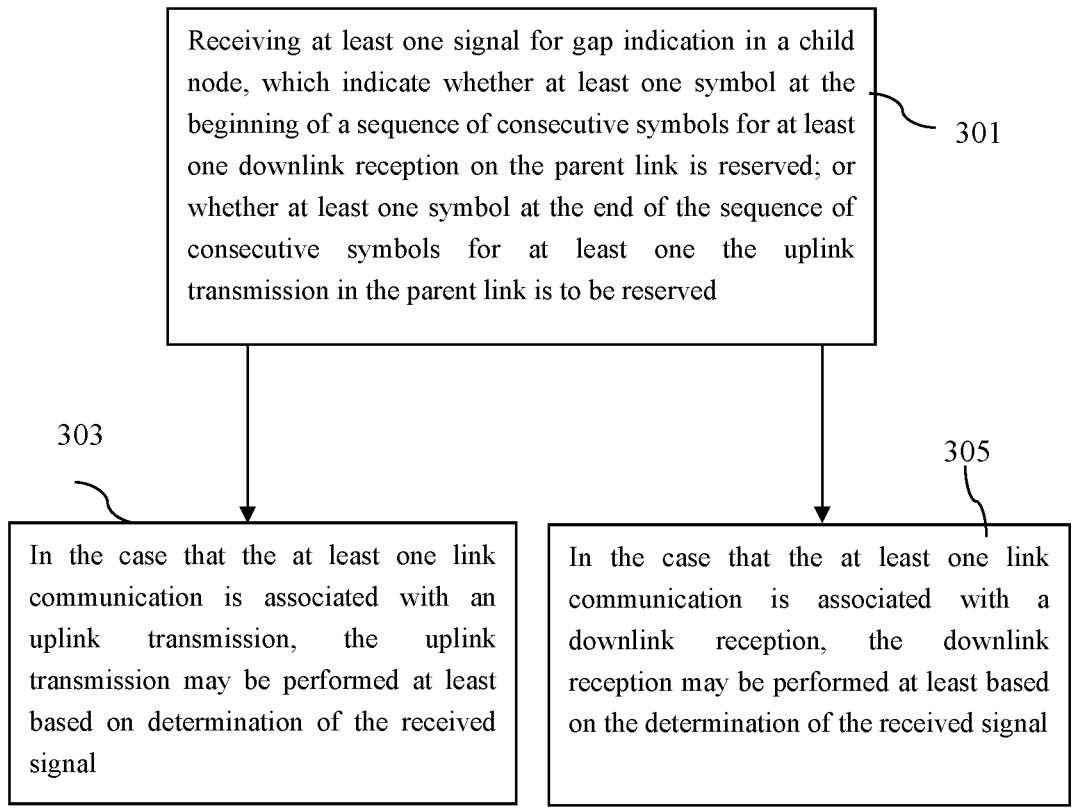
FIG. 3 is a flow chart for illustrating a method for slot format indication under the first timing scenario of Case 7 timing in the view of a child node according to an embodiment of the present application.

FIG. 3 is a flow chart for illustrating a method for slot format indication under the first timing scenario of Case 7 timing in the view of a child node according to an embodiment of the present application. The child node can be a child IAB node or a UE 30, for example the second IAB node 20b with respect to the first IAB node 20a or the first UE 30a with respect to the second IAB node 20b in FIG. 1. For the child node, the uplink reception and downlink transmission on a child link for its parent node in the first timing scenario correspond to the uplink transmission and downlink reception in a parent link for the child node, respectively.

Specifically, as shown in FIG. 3, in step 301, at least one signal for gap indication may be received by the child node, for example from its parent node. The received signal may indicate whether at least one symbol at the beginning of a sequence of consecutive symbols transmitted or received over a communication link, i.e., a sequence of consecutive symbols for at least one downlink reception on the parent link under the first timing scenario, is reserved; or whether at least one symbol at the end of the sequence of consecutive symbols transmitted or received over the communication link, i.e. a sequence of consecutive symbols for at least one uplink transmission in the parent link under the first timing scenario, is to be reserved. The at least one symbol can be one or more symbols, which can be decided based on the value of TA (timing advance) for uplink transmission with respect to downlink reception performed by the parent node of the child node. The value of TA for uplink transmission with respect to downlink reception can be achieved via a TA command as provided in TS 38.211, which defines the maximum value of TA for uplink transmission with respect to downlink reception in an IAB node.

Embodiments of the present application may introduce a new slot format with the least one reserved symbol via a signal, represented as: UUUUUUUUUUUUUF, FDDDDDDDDDDDDD, DDFFUUFDDFFUUU or DDFFUUUFDFFUUU etc. Wherein "U" represents a symbol for uplink communication, which may be an uplink transmission or an uplink reception; "D" represents a symbol for downlink communication, which may be a downlink transmission or a downlink reception; and "F" represents a reserved symbol that does not carry valid data for uplink or downlink communication. For the slot format UUUUUUUUUUUUUF, it means that a symbol at the ending of a sequence of consecutive uplink symbols, e.g., "F" in the last symbol, is reserved. For the slot format FDDDDDDDDDDDDD, it means that a symbol at the beginning of a sequence of consecutive downlink symbols, e.g., "F" in the first symbol is reserved. For the slot format DDFFUUFDDFFUUU, it means that a symbol at the ending of a sequence of consecutive uplink symbols, e.g., "F" in the $7^{th}$ symbol is reserved. For the slot format DDFFUUUFDFFUUU, it means that a symbol at the beginning of a sequence of consecutive uplink symbols, e.g., "F" in the $8^{th}$ symbol is reserved. That is, in the case of indicating a slot format, the received signal explicitly indicates whether at least one symbol at the beginning of a sequence of consecutive symbols transmitted or received over a communication link is reserved or is to be reserved; or whether at least one symbol at the end of the sequence of consecutive symbols transmitted or received over the communication link is reserved or is to be reserved.

The new slot format can be transmitted via the signal from a donor node 10 to an IAB node 20 or a UE 30 in an embodiment of the present application. In another embodiment of the present application, the new slot format can be transmitted from an IAB node 20 to its child node, which may be a child IAB node or a UE 30.

In another embodiment of the present application, the received signal may explicitly indicate at least one symbol at the end of a sequence of consecutive symbols for at least one uplink transmission in the child link is to be reserved, so that at least one uplink reception in the parent node can provide a communication gap before subsequent downlink transmission. In another embodiment of the present application, the signal may explicitly indicate at least one symbol at the beginning of a sequence of consecutive symbols for at least one downlink reception in the child link is reserved, so that there is a communication gap at least at the beginning of the downlink transmission in the parent node. The signal may represent a common message communicated to a group of UEs 30, for example a downlink control information (DCI) signaling.

In yet another embodiment of the present application, for the IAB node 20 wherein the first timing scenario happens, the received signal may also indicate whether simultaneous reception from a parent link and a child link is enabled, i.e., a Case 7 timing enabling message. The child node can receive this enabling signal from its parent node. In case that simultaneous reception from a parent link and a child link is enabled, there is a communication gap at the end of a sequence of consecutive symbols for uplink reception or at the beginning of sequence of consecutive symbols for downlink transmission. Otherwise, no communication gap is existent between the sequence of consecutive symbols for uplink reception and the sequence of consecutive symbols for downlink transmission. In an example of the present application, the Case 7 timing enabling message can be indicated via a radio resource control (RRC) signal.

In step 303, in the case that the communication link is associated with an uplink transmission, the uplink transmission may be performed at least based on determination of the received signal. In the case that the determination indicates that at least one symbol is to be reserved at the end of a sequence of consecutive symbols for an uplink transmission, the uplink transmission will be transmitted as indicated, that is, reserving at least one symbol at the end of a sequence of consecutive symbols for the uplink transmission, for example in a slot format like "UUUUUUUUUUUUUF" Otherwise, the uplink transmission is performed as normal without any symbol reserved.

In step 305, in the case that the communication link is associated with a downlink reception, the downlink reception may be performed at least based on the determination of the received signal. In the case that it is determined that at least one symbol is reserved at the beginning of a sequence of consecutive symbols for a downlink reception, the downlink reception will be received as indicated, that is, at least one symbol at the beginning of a sequence of consecutive symbols for the downlink transmission is reserved, for example in a slot format like "FDDDDDDDDDDDDDD." Otherwise, the downlink communication is performed as normal without any symbol reserved. As stated above, the downlink reception in a child node corresponds to the downlink transmission in the parent node of the child node. That means the downlink transmission in the parent node is performed as indicated to the child node.

For example, in the view of the second IAB node 20b, the link between the second IAB node 20b and the first IAB node 20a is a parent link. The second IAB node 20b may receive at least one signal indicating whether at least one symbol at the end of a sequence of consecutive symbols for at least one uplink transmission is to be reserved, or at least one symbol at the beginning of a sequence of consecutive symbols for at least one downlink reception is reserved. The signal may be received from the first IAB node 20a, where the first timing scenario happens. The signal can explicitly indicate a slot format signal, or explicitly indicate on which transmission the at least one symbol is reserved or to be reserved via a DCI signaling. In another embodiment of the present application, the signal can implicitly indicate the existence of the at least one reserved symbol by simultaneous reception from parent link and child link enabling message, etc.

Accordingly, in the case that the second IAB node 20b needs to perform an uplink transmission to the first IAB node 20a, the second IAB node 20b may perform the uplink transmission at least based on the determination of the received at least one signal. In the case that the determination indicates that at least one symbol is to be reserved at the end of a sequence of consecutive symbols for at least one uplink transmission, the uplink transmission will be transmitted to the first IAB node 20a as indicated, that is, reserving at least one symbol at the end of a sequence of consecutive symbols for the uplink transmission, for example in a slot format like "UUUUUUUUUUUUUUF." Otherwise, the uplink communication is performed as normal without any symbol reserved. In the case that the determination indicates that at least one symbol is reserved at the beginning of a sequence of consecutive symbols for at least one downlink reception, the downlink reception will be received as indicated, that is, at least one symbol being reserved at the beginning of a sequence of consecutive symbols for the downlink reception, for example in a slot format like "FDDDDDDDDDDDDDD." Otherwise, the downlink reception is performed as normal without any symbol reserved.

According to embodiments of the present application, a second timing scenario under Case 7 timing is: performing an uplink transmission in a slot subsequent to that for an uplink reception in an IAB node 20, for example the first IAB node 20a or the second IAB node 20b as shown in FIG. 1. The uplink transmission can be followed by another uplink transmission or other type of communication, and the uplink reception can be subsequent to another uplink reception or other type of communication. For the IAB node, the uplink reception is performed over the child link while the uplink transmission is performed over the parent link. The child link can be a backhaul link or an access link; while the parent link can only be a backhaul link.

An uplink transmission can start before or after an uplink reception in a child node in different cases. Taking the second IAB node 20b in FIG. 1 as an example, the starting position of the uplink reception in the second IAB node 20b as "Child Node UL Rx" in FIG. 2 is aligned with that of the downlink reception as "Child Node DL Rx" in FIG. 2, which is decided by the propagation delay P2 between the first IAB node 20a and the second IAB node 20b. Thus, the starting position of the uplink reception is T+P2, wherein "T" is the slot beginning boundary. Meanwhile, the starting position of the uplink reception and downlink reception in the first IAB node 20a, i.e., "Current Node UL Rx" and "Current Node DL Rx" are aligned in FIG. 2. Thus, the starting position of the uplink transmission in the second IAB node 20b is decided by both the propagation delay P1 between the donor node 10 and the first IAB node 20a, and the propagation delay P2 between the first IAB node 20a and the second IAB node 20b. Accordingly, the starting position of the uplink transmission of the second IAB node 20b is T+P1-P2. Since P1 and P2 can be an arbitrary value, the uplink transmission in the second IAB node 20b can start before or after the uplink reception in the second IAB node 20b.

In the case that the negative value of TA for an uplink transmission with respect to an uplink reception, i.e., (P1−2*P2) is not less than the time for switching between performing reception and transmission by the IAB node 20, there is no overlap between the uplink reception and the uplink transmission and accordingly no communication gap is necessary for an uplink reception and a subsequent uplink transmission. Otherwise, there is an overlap between the uplink reception and its subsequent uplink transmission. Accordingly, a communication gap is provided for the uplink reception and its subsequent uplink transmission to avoid data carried on the overlapped part being lost. The communication gap can be achieved by reserving at least one symbol at the end of a sequence of consecutive symbols for at least one uplink reception or at the beginning of a sequence of consecutive symbols for at least one uplink transmission in the IAB node 20. The at least one symbol can be one, two or three symbols, which can be decided based on the value of TA for uplink transmission with respect to downlink reception performed by the IAB node 20. Similarly, the largest number of the reserved or to be reserved symbols for the communication gap can be calculated based on the largest value of the TA for uplink transmission with respect to downlink reception performed by the same node provided in TS 38.211, e.g. 3 symbols. Regarding whether the communication gap is at the end of a sequence of consecutive symbols for at least one uplink reception or at the beginning of a sequence of consecutive symbols for at least one uplink transmission in the IAB node, the selected solution can be indicated to concerned nodes via a signal, for example a DCI signal or RRC signal. In other embodiment of the present application, the selected solution can be predefined in the 3GPP specification.

Figure 4:
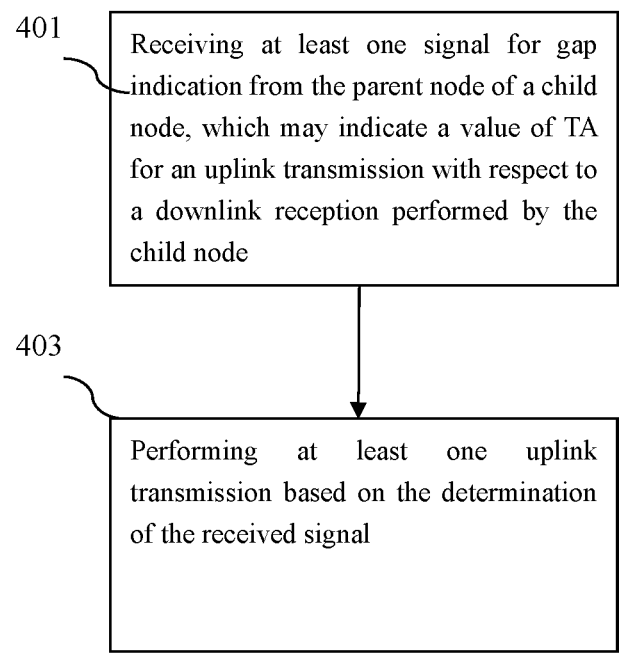
FIG. 4 is a flow chart for illustrating a method for slot format indication under the second timing scenario of Case 7 timing in the view of a child node according to an embodiment of the present application.

FIG. 4 is a flow chart for illustrating a method for slot format indication under the second timing scenario of Case 7 timing in the view of a child node according to an embodiment of the present application. The child node can be a child IAB node, for example the first IAB node 20a with respect to the donor node 10, or the second IAB node 20b with respect to the first IAB node 20a as shown in FIG. 1.

In this embodiment, the child node is the IAB node 20 wherein the second timing scenario happens. As shown in FIG. 4, in step 401, at least one signal for gap indication may be received, for example from the parent node of the child node. The at least one signal may indicate a value of TA for an uplink transmission with respect to a downlink reception performed by the child node, i.e., —(P1−2*P2). Since uplink reception timing is aligned with downlink reception timing in a node, the value of TA of an uplink transmission with respect to an uplink reception can be decided by the value of TA for an uplink transmission with respect to a downlink reception. That is, the at least one signal may indicate a value of TA for an uplink transmission with respect to a downlink reception performed by the same node via a TA command.

The at least one signal may also indicate that a solution reserving at least one symbol at the beginning of a sequence of consecutive symbols for at least one uplink transmission is enabled. In another embodiment of the present application, the child node may be predefined to enable this solution according to the 3GPP specification. Accordingly, the child node may determine whether a symbol is to be reserved for the at least one uplink transmission to be performed, so that the uplink transmission can be properly performed.

Based on the value of TA for an uplink transmission with respect to an uplink reception or downlink reception performed by the child node, whether at least one symbol is reserved at the beginning of a sequence of consecutive symbols for the at least one uplink transmission can be determined. That is, the TA command implicitly indicates whether at least one symbol is to be reserved at the beginning of a sequence of consecutive symbols for the at least one uplink transmission. TA is defined as the time difference between DL Rx and UL Tx in a node. When UL Tx is before DL Rx, the TA value is a positive value, and when the starting position of UL Tx is later than the starting position of DL Rx, the TA value is a negative value. In the case that the negative value of TA is larger than or equal to a threshold, for example the time for switching between performing reception and transmission by the child IAB node 20, the determination of received signal may indicate that no symbol is to be reserved in the uplink transmission. The threshold is determined by hardware, e.g. 20 us. Otherwise, it may indicate that at least one symbol is reserved at the beginning of a sequence of consecutive symbols for the at least one uplink transmission. In step 403, at least one uplink transmission can be performed at least based on the determination of the received signal. In another embodiment of the present application, no symbol will be reserved for the uplink transmission in the case that the determination indicates that no symbol is to be reserved for the uplink transmission.

Taking the second IAB node 20*b* as an example, it may receive at least one signal from the first IAB node 20*a* that may indicate that reserving at least one symbol at the end of a sequence of consecutive symbols for an uplink transmission is enabled. Another received signal may be a TA command indicating a value of TA for an uplink transmission with respect to a downlink reception performed by the second IAB node 20*b*. To properly perform the uplink transmission to the first IAB node 20*a*, the second IAB node 20*b* may determine whether to reserve at least one symbol at the beginning of a sequence of consecutive symbols for the uplink transmission based on the TA value. In the case that the negative value of TA is larger than or equal to a threshold, for example the time for switching between performing reception and transmission by the second IAB node 20*b*, the determination of received signal may indicate that no symbol is to be reserved in the uplink transmission. Otherwise, it may indicate that at least one symbol is to be reserved at the beginning of a sequence of consecutive symbols for the uplink transmission. Then, the second IAB node 20*b* may perform the uplink transmission at least based on the determination of the received signal.

Figure 5:
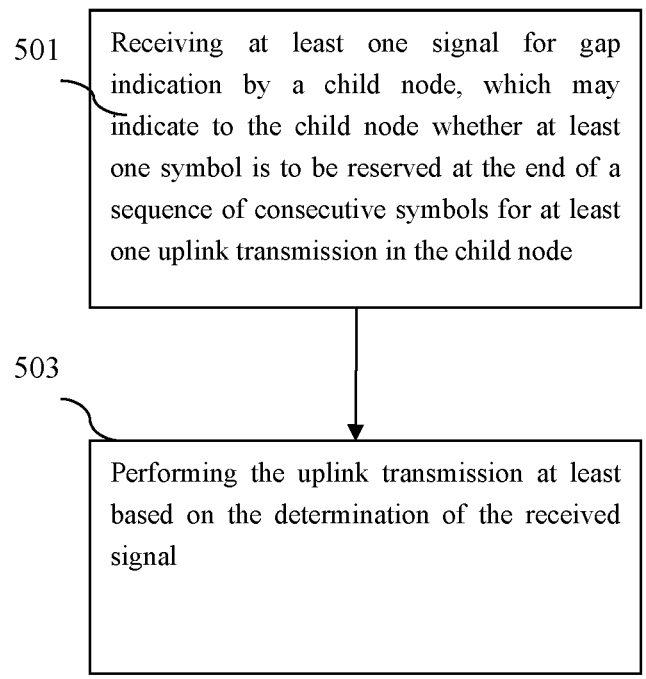
FIG. 5 is a flow chart for illustrating a method for slot format indication under the second timing scenario of Case 7 timing in the view of a child node according to another embodiment of the present application.

FIG. 5 is a flow chart for illustrating a method for slot format indication under the second timing scenario of Case 7 timing in the view of a child node according to another embodiment of the present application. The child node can be a child IAB node or a UE 20, for example the second IAB node 20*b* with respect to the first IAB node 20*a* or the first UE 30*a* with respect to the second IAB node 20*b* in FIG. 1. The parent node of the child node is the IAB node 20 wherein the second timing scenario happens. For the child node, an uplink reception in its parent node corresponds to an uplink transmission in the parent link of the child node.

As shown in FIG. 5, in step 501, at least one signal for gap indication may be received by the child node, for example a UE 30 or a child IAB node's MT. Different from the parent node, the child node cannot get the TA value for an uplink transmission with respect to an uplink reception or downlink reception performed by the parent node via a TA command. According to an embodiment of the present application, the parent node may explicitly indicate to the child node whether at least one symbol is to be reserved at the end of a sequence of consecutive symbols for at least one uplink transmission in the child node, so that the parent node can perform corresponding uplink reception without overlapping subsequent uplink transmission.

Specifically, the parent node can determine the number of symbols to be reserved based on the TA value for an uplink transmission with respect to an uplink reception performed by the parent node. In the case that the negative value of TA for an uplink transmission with respect to an uplink reception performed by the parent node is larger than or equal to a threshold, for example the time for switching between performing reception and transmission by the parent node, the determination of received signal may indicate that no symbol is to be reserved in the uplink reception. The threshold is determined by hardware, e.g. 20 us. Otherwise, it may indicate that at least one symbol is to be reserved at the end of a sequence of consecutive symbols for the uplink reception.

Accordingly, at least one signal indicating whether at least one symbol at the end of the sequence of consecutive symbols for at least one uplink transmission in the child node, i.e. the uplink reception in the parent node, can be received from the child node. In the case that at least one symbol is to be reserved for the uplink reception in the parent node, i.e. uplink transmission in the child node, the parent node may indicate at least one slot format to the child node via the at least one gap indication signal. For example, the at least one symbol to be reserved at the end of the at least one slot may be indicated as "non-available," while the other symbols in the slot may be indicated as "uplink" or other valid symbols. The slot format can be a dynamic message received by the child node. The dynamic message can be carried by a group common message, for example a DCI signal like DCI 2.0.

The gap indication signal can be applicable to only a group of consecutive symbol sequences for the uplink transmission in the child node, or applicable to multiple groups of consecutive symbol sequences for the uplink transmission in the child node within a period. The length of the period and the offset for the groups of consecutive symbol sequences can also be configured via the received signal from the parent node, for example a RRC signal.

In step 503, the uplink transmission can be performed at least based on the determination of the received signal. That is, at least one symbol may be reserved at the end of a sequence of consecutive symbols for at least one uplink transmission as indicated by the received slot format.

Taking the second IAB node 20b as an example, it may receive at least one gap indication signal (e.g. within a DCI signaling) from the first IAB node 20a. The DCI signaling can also be transmitted from a BS 10 to a UE30. The first IAB node 20a is the IAB node 20 where the second timing scenario happens. A DCI signaling may indicate a slot format wherein at least one symbol is to be reserved at the end of a sequence of consecutive symbols for an uplink transmission in the second IAB node 20b. The second IAB node 20b may perform the uplink transmission at least based on the determination of the received signal.

The third timing scenario under the Case 7 timing scheme can be described as: performing a downlink transmission in a slot subsequent to that for an uplink transmission in an IAB node 20. The downlink transmission can be followed by another downlink transmission or other type of communication, and the uplink transmission can be subsequent to another uplink transmission or other type of communication.

Specifically, under Case 7 timing scheme, the boundary of a downlink transmission is always aligned with the boundary of a slot, while the boundary of an uplink transmission depends on the TA for the uplink transmission with respect to a downlink reception performed by the same IAB node 20. Taking the second IAB node 20b as an example, the starting position of uplink transmission in the second IAB node 20b is T+P1−P2 as "Child Node UL Tx" shown in FIG. 1, wherein T is the boundary of a slot. In the case that P2−P1 is larger than or equal to zero, no communication gap between the uplink transmission and its subsequent downlink transmission is necessary. Otherwise, a communication gap between the uplink transmission and its subsequent downlink transmission can be created between the uplink transmission and its subsequent downlink transmission for the child IAB node, so that no valid data in the uplink transmission or its subsequent downlink transmission is lost. According to an embodiment of the present application, the communication gap can be 1 or 2 symbols. The largest number of symbols for the communication gap can be calculated based on the largest value of the TA for uplink transmission with respect to downlink reception performed by the same node provided in TS38.211. Since both the communication in the parent link and child link for an IAB node 20 are transmission, there is no time required for switching between performing reception and transmission in the IAB node. That is, in the case that P2-P1 is not less than zero, i.e., the starting of the downlink transmission not earlier than the ending of the uplink transmission, no communication gap between the uplink transmission and its subsequent downlink transmission is necessary.

The communication gap can be achieved by reserving at least one symbol at the end of a sequence of consecutive symbols for the uplink transmission or at the beginning of a sequence of consecutive symbols for the downlink transmission in the IAB node. The selected one of the two solutions can be indicated to concerned nodes via a signal, for example a DCI signaling or RRC signaling. In other embodiment of the present application, the selected one of the two solutions can be predefined in the 3GPP specification.

Figure 6:
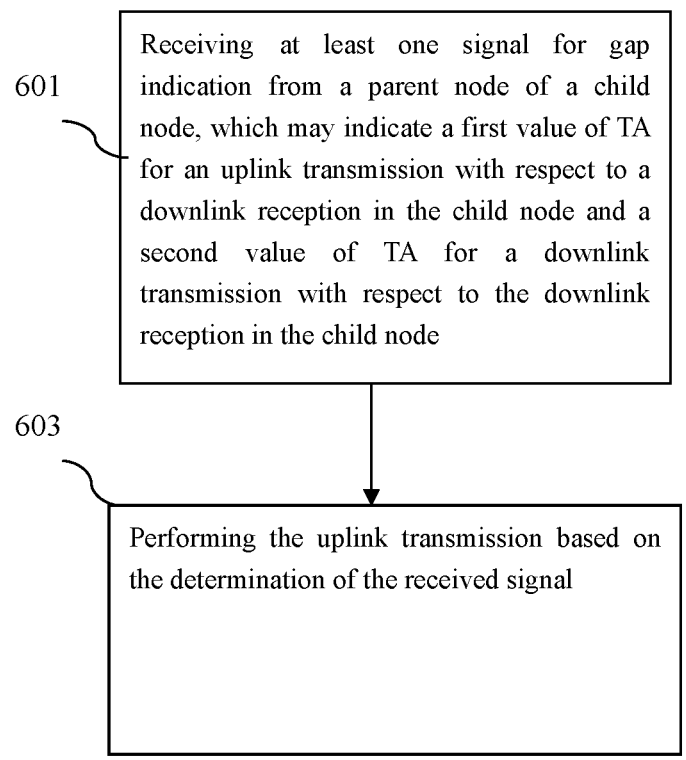
FIG. 6 is a flow chart for illustrating a method for slot format indication under the third timing scenario of Case 7 timing in the view of a child node according to an embodiment of the present application.

FIG. 6 is a flow chart for illustrating a method for slot format indication under the third timing scenario of Case 7 timing in the view of a child node according to an embodiment of the present application. The child node can be a child IAB node, for example the first IAB node 20a with respect to the donor node 10, or the second IAB node 20b with respect to the first IAB node 20a as shown in FIG. 1.

In this embodiment, the child node is the IAB node 20 wherein the third timing scenario happens. As shown in FIG. 6, in step 601, at least one signal for gap indication may be received, for example from its parent node. The at least one signal may indicate a first value of TA for an uplink transmission with respect to a downlink reception performed by the child node and a second value of TA for a downlink transmission with respect to the downlink reception performed by the child node. Accordingly, the value of TA for a downlink transmission with respect to an uplink transmission performed by the node, i.e., P1-P2, can be calculated.

The at least one signal may also indicate that a solution reserving at least one symbol at the end of a sequence of consecutive symbols for at least one uplink transmission is enabled. In another embodiment of the present application, the child node may be predefined to enable this solution according to the 3GPP specification. Accordingly, the child node may determine whether to reserve at least one symbol at the end of a sequence of consecutive symbols for at least one uplink transmission, so that the uplink transmission can be properly performed.

Based on the calculated value of TA for a downlink transmission with respect to an uplink transmission, whether at least one symbol is to be reserved at the end of a sequence of consecutive symbols for the uplink transmission can be determined. That is, the at least one received signal implicitly indicates whether at least one symbol is to be reserved at the end of a sequence of consecutive symbols for the uplink transmission. In the case that the value of TA for a downlink transmission with respect to an uplink transmission is smaller than or equal to zero, the determination may indicate that no symbol is to be reserved in the uplink transmission. That is, no communication gap between the uplink transmission and its subsequent downlink transmission is necessary. Otherwise, it may indicate that at least one symbol is to be reserved at the end of a sequence of consecutive symbols for at least one uplink transmission, and a communication gap between the uplink transmission and its subsequent downlink transmission is necessary.

In step 603, the uplink transmission can be performed at least based on the determination of the received signal. In an embodiment of the present application, at least one symbol is to be reserved at the end of consecutive symbols for at least one uplink transmission in the case that the determination of the received signal indicates that a communication gap between the uplink transmission and the subsequent downlink transmission is necessary. In another embodiment of the present application, no symbol will be reserved for the uplink transmission in the case it is determined that no communication gap is necessary between the uplink transmission and the subsequent downlink transmission.

Taking the second IAB node 20b as an example, it may receive at least one signal from the first IAB node 20a that may indicate that a solution for reserving at least one symbol at the end of a sequence of consecutive symbols for an uplink transmission is enabled. The at least one signal may also indicate a first value of TA of an uplink transmission with respect to a downlink reception and a second value of TA of a downlink transmission with respect to the downlink reception from the first IAB node 20a. Accordingly, a value of TA of a downlink transmission with respect to an uplink transmission performed by the second IAB node 20b, i.e., P2-P1 as stated above, can be calculated by the second IAB node 20b.

Based on the calculated value of TA of a downlink transmission with respect to an uplink transmission, the second IAB node 20b can determine whether a communication gap is necessary between the uplink transmission and the subsequent downlink transmission. Then the second IAB node 20b may perform the uplink transmission at least based on the determination of the received signal.

Figure 7:
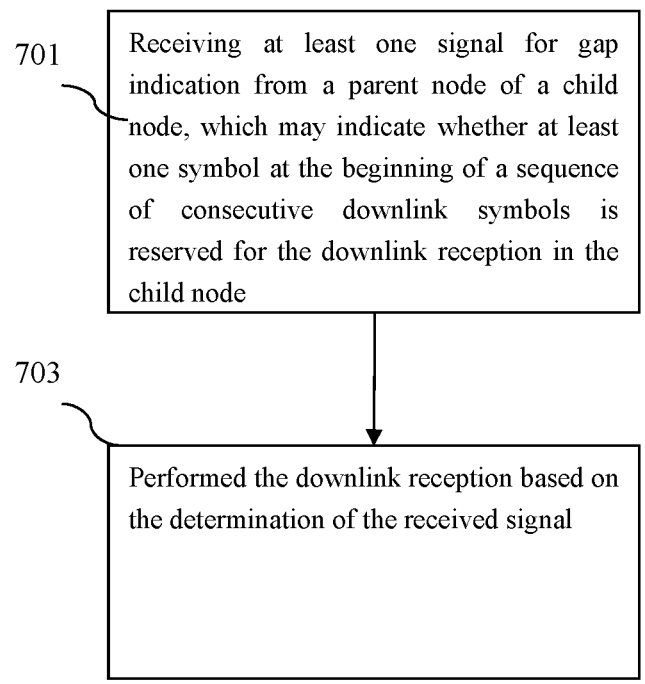
FIG. 7 is a flow chart for illustrating a method for slot format indication under the third timing scenario of Case 7 timing in the view of a child node according to another embodiment of the present application.

FIG. 7 is a flow chart for illustrating a method for slot format indication under the third timing scenario of Case 7 timing in the view of a child node according to another embodiment of the present application. The child node can be a child IAB node or a UE 30, for example the second IAB node 20b with respect to the first IAB node 20a or the first UE 30a with respect to the second IAB node 20b in FIG. 1. The parent node of the child node is the IAB node 20 wherein the third timing scenario happens. For the child node, a downlink transmission in the child link of its parent node corresponds to a downlink reception in the parent link of the child node.

As shown in FIG. 7, in step 701, at least one signal for gap indication may be received, for example from the parent node. Different from the parent node, the child node does not have sufficient information to determine TA value for a downlink transmission with respect to an uplink transmission performed by the parent node. According to an embodiment of the present application, the parent node may explicitly indicate to the child node whether at least one symbol at the beginning of a sequence of consecutive downlink symbols is reserved for the downlink reception in the child node.

Specifically, the parent node can determine the number of symbols to be reserved based on the calculated TA value for a downlink transmission with respect to an uplink transmission performed by the parent node. In the case that the value of TA for a downlink transmission with respect to an uplink transmission is smaller than or equal to zero, the determination may indicate that no symbol is to be reserved in the downlink transmission. Otherwise, it may indicate that at least one symbol is to be reserved at the end of a sequence of consecutive symbols for at least one downlink transmission, and a communication gap between the uplink transmission and its subsequent downlink transmission is necessary.

Accordingly, at least one signal indicating whether at least one symbol at the beginning of the sequence of consecutive symbols for the downlink reception in the child node, i.e. the downlink transmission in the parent node, can be received from the parent IAB node. In the case that at least one symbol is reserved for the downlink reception in the child node, the parent node may indicate a slot format for the downlink reception to the child node via the at least one gap indication signal. For example, the at least one symbol reserved at the beginning of the slot may be indicated as "non-available," while the other symbols in the slot may be indicated as "downlink" or other valid symbols. The slot format can be a dynamic message received by the child node. The dynamic message can be carried by a group common message, for example a DCI signaling like DCI 2.0.

The gap indication signal can be applicable to only a group of consecutive symbol sequences for the downlink reception in the child node, or applicable to multiple groups of consecutive symbol sequences for the downlink reception in the child node within a period. The length of the period and the offset for the groups of consecutive symbol sequences can also be configured via the received signal from the parent node, for example a RRC signaling.

In step 703, the downlink reception can be performed at least based on the determination of the received signal. That is, at least one symbol may be reserved at the beginning of a sequence of consecutive symbols for the downlink reception as indicated by the received slot format.

Taking the second IAB node 20b as an example, it may receive at least one gap indication signal, e.g. within a DCI signaling from the first IAB node 20a. The first IAB node 20a is the IAB node 20 where the third timing scenario happens. A DCI signaling may indicate a slot format wherein at least one symbol is reserved at the beginning of a sequence of consecutive symbols for a downlink reception in the second IAB node 20b. The second IAB node 20b may perform the downlink reception based on the received slot format to ensure the uplink reception is properly performed.

Embodiments of the present application also provide an apparatus for timing in a wireless communication system, which can at least implement a method for timing in the wireless communication system according to embodiment of the present application.

Figure 8:
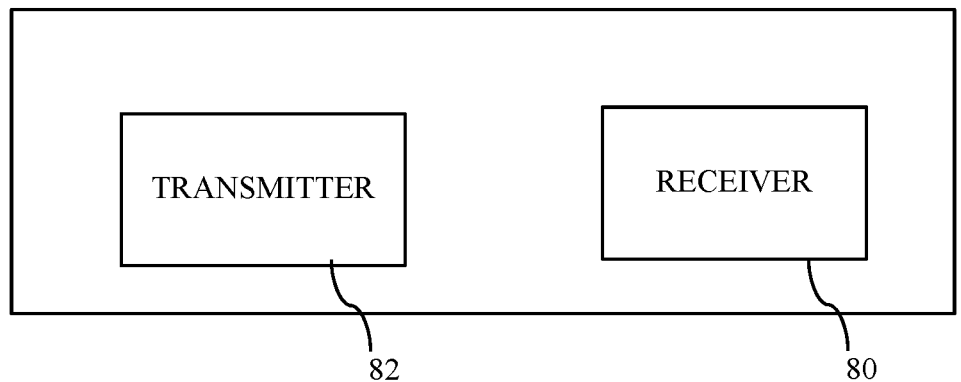
FIG. 8 illustrates a block diagram of an apparatus for slot format indication in a wireless communication system according to an embodiment of the present application.

FIG. 8 illustrates a block diagram of an apparatus 800 for slot format indication in a wireless communication system 100 according to an embodiment of the present application.

As shown in FIG. 8, the apparatus 800 includes at least one receiver 80 and at least one transmitter 82. The at least one receiver 80 may receive at least one signal indicating one of: whether at least one symbol at the beginning of a sequence of consecutive symbols transmitted or received over a communication link is reserved or to be reserved, and whether at least one symbol at the end of the consequence of consecutive symbols transmitted or received over the communication link is reserved or to be reserved. The at least one receiver 80 may also perform at least one downlink reception at least based on the received signal in response to the communication link being associated with a downlink reception. The at least one transmitter 82 may perform at least one uplink transmission based on the received signal in response to the communication link being associated with uplink transmission. In an example embodiment of the present application, the at least one receiver 80 and the at least one transmitter 82 can be integrated into at least one transceiver.

Figure 9:
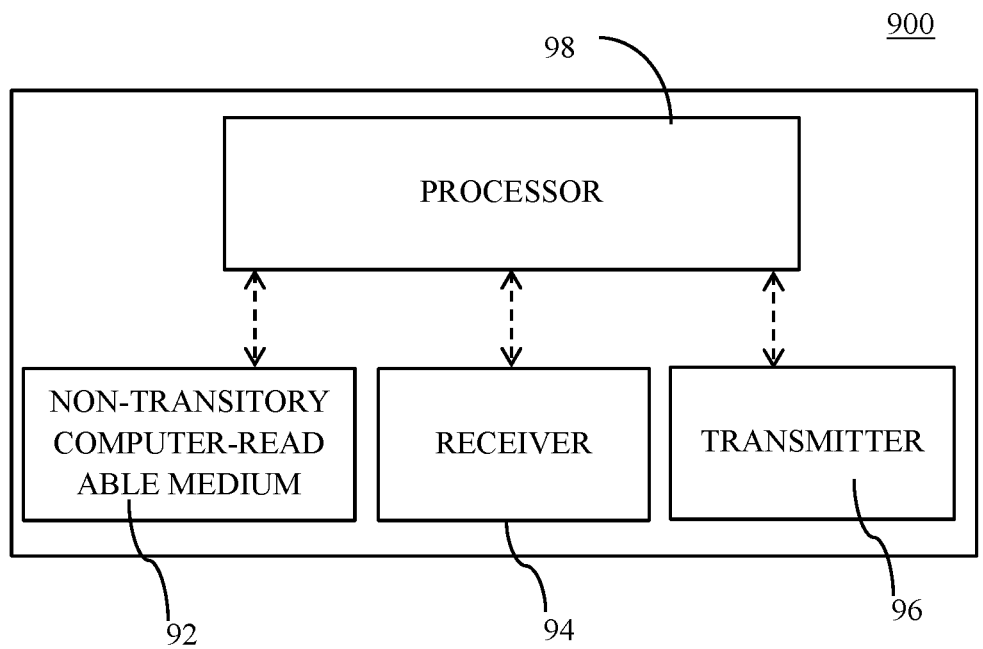
FIG. 9 illustrates a block diagram of an apparatus for slot format indication in a wireless communication system according to another embodiment of the present application.

FIG. 9 illustrates a block diagram of an apparatus 900 for slot format indication in a wireless communication system 100 according to another embodiment of the present application.

As shown in FIG. 9, an apparatus 900 may include at least one non-transitory computer-readable medium 92 having computer executable instructions stored therein; at least one receiver 94; at least one transmitter 96; and at least one processor 98 coupled to the at least one non-transitory computer-readable medium 92, the at least one receiver 94 and the at least one transmitter 96. The computer executable instructions are programmed to implement a method for target IAB node selection according to an embodiment of the present application with the at least one receiver 94, the at least one transmitter 96 and the at least one processor 98. In an example embodiment of the present application, the at least one receiver 80 and the at least one transmitter 82 can be integrated into at least one transceiver.

Those having ordinary skill in the art would understand that as the 3GPP and the communication technology develop, the terminologies recited in the specification may change, which should not affect the principle of the application.

Meanwhile, those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

In this document, the terms "comprises," "comprising," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The terms "including," "having," and the like, as used herein, are defined as "comprising."

What is claimed is:

1. A method performed by an apparatus, the method comprising:
   receiving at least one signal indicating a slot format, wherein the slot format indicates at least one of:
   whether at least one symbol at a beginning of a sequence of consecutive symbols of the slot format transmitted or received over a communication link is reserved or is to be reserved, wherein the at least one symbol being reserved comprises the at least one symbol being unavailable so that no valid data is carried therein; and
   whether at least one symbol at an end of the sequence of consecutive symbols of the slot format transmitted or received over the communication link is reserved or is to be reserved;
   performing at least one uplink transmission based on the at least one signal in response to the communication link being associated with uplink transmission; and
   performing at least one downlink reception based on the at least one signal in response to the communication link being associated with downlink reception, wherein the at least one signal indicates whether simultaneous reception from a parent backhaul link of an integrated access and backhaul node and a child link of the integrated access and backhaul node is enabled, and the child link is a child backhaul link or an access link.

2. The method according to claim 1, wherein the at least one signal indicates a timing advance value for an uplink transmission with respect to a downlink reception performed by a node.

3. The method according to claim 2, wherein, in response to a negative value of the timing advance value for the uplink transmission with respect to the downlink reception being greater than or equal to a threshold, the at least one signal indicates that no symbol is reserved or to be reserved.

4. The method according to claim 3, wherein the threshold comprises a time for the node to switch between performing reception and transmission.

5. The method according to claim 1, wherein the at least one signal is a downlink control information signaling or a radio resource control signaling, and the at least one signal indicates that:
   the at least one symbol at the beginning of the sequence of consecutive symbols transmitted or received over the communication link is reserved or to be reserved; or
   the at least one symbol at the end of the sequence of consecutive symbols transmitted or received over the communication link is reserved or to be reserved.

6. The method according to claim 1, wherein the at least one signal indicates a first timing advance value for an uplink transmission with respect to a downlink reception and a second timing advance value for a downlink transmission with respect to the downlink reception.

7. The method according to claim 6, wherein, in response to the second timing advance value being less than or equal to the first timing advance value, the at least one signal indicates that no symbol is reserved or is to be reserved.

8. The method according to claim 1, wherein the at least one signal includes a radio resource control signaling identifying the communication link as a parent backhaul link or a child link, and the child link is a child backhaul link or an access link.

9. The method according to claim 1, wherein the at least one signal indicates a slot format transmitted or received over the communication link.

10. An apparatus, comprising:
    at least one memory; and
    at least one processor coupled with the at least one memory and configured to cause the apparatus to:
    receive at least one signal indicating a slot format, wherein the slot format indicates at least one of:
    whether at least one symbol at a beginning of a sequence of consecutive symbols of the slot format transmitted or received over a communication link is reserved or is to be reserved, wherein the at least one symbol being reserved comprises the at least one symbol being unavailable so that no valid data is carried therein; and
    whether at least one symbol at an end of the sequence of consecutive symbols of the slot format transmitted or received over the communication link is reserved or is to be reserved;
    perform at least one downlink reception based on the at least one signal in response to the communication link being associated with downlink reception; and
    perform at least one uplink transmission based on the at least one signal in response to the communication link being associated with uplink transmission, wherein the at least one signal indicates whether simultaneous reception from a parent backhaul link of an integrated access and backhaul node and a child link of the integrated access and backhaul node is enabled, and the child link is a child backhaul link or an access link.

11. The apparatus according to claim 10, wherein the at least one signal indicates a timing advance value for an uplink transmission with respect to a downlink reception performed by a node.

12. The apparatus according to claim 11, wherein, in response to a negative value of the timing advance value for the uplink transmission with respect to the downlink reception being greater than or equal to a threshold, the at least one signal indicates that no symbol is reserved or to be reserved.

13. The apparatus according to claim 12, wherein the threshold comprises a time for the node to switch between performing reception and transmission.

14. The apparatus according to claim 10, wherein the at least one signal is a downlink control information signaling or a radio resource control signaling, and the at least one signal indicates that:

the at least one symbol at the beginning of the sequence of consecutive symbols transmitted or received over the communication link is reserved or is to be reserved; or the at least one symbol at the end of the sequence of consecutive symbols transmitted or received over the communication link is reserved or is to be reserved.

15. The apparatus according to claim 10, wherein the at least one signal indicates a first timing advance value for an uplink transmission with respect to a downlink reception and a second timing advance value for a downlink transmission with respect to the downlink reception.

16. The apparatus according to claim 15, wherein, in response to the second timing advance value being less than or equal to the first timing advance value, the at least one signal indicates that no symbol is reserved or is to be reserved.

17. The apparatus according to claim 10, wherein the at least one signal comprises a radio resource control signaling identifying the communication link as a parent backhaul link or a child link, and the child link is a child backhaul link or an access link.

18. The apparatus according to claim 10, wherein the at least one signal indicates a slot format for the communication link.

* * * * *